(12) United States Patent
Lu et al.

(10) Patent No.: US 11,853,483 B2
(45) Date of Patent: Dec. 26, 2023

(54) IMAGE PROCESSING METHOD AND APPARATUS FOR SMART PEN INCLUDING PRESSURE SWITCHES, AND ELECTRONIC DEVICE

(71) Applicant: Shenzhen Eaglesoul Education Service Co., Ltd, Guangdong (CN)

(72) Inventors: Qiwei Lu, Guangdong (CN); Fangyuan Chen, Hubei (CN); Yang Lu, Guangdong (CN); Pengyu Chen, Guangdong (CN)

(73) Assignee: SHENZHEN EAGLE SOUL INTELLIGENCE & TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/256,211

(22) PCT Filed: Aug. 24, 2020

(86) PCT No.: PCT/CN2020/110912
§ 371 (c)(1),
(2) Date: Dec. 27, 2020

(87) PCT Pub. No.: WO2022/016649
PCT Pub. Date: Jan. 27, 2022

(65) Prior Publication Data
US 2023/0140470 A1      May 4, 2023

(30) Foreign Application Priority Data
Jul. 21, 2020   (CN) .......................... 202010703394.2

(51) Int. Cl.
*G06F 3/0354*      (2013.01)
*G06F 3/038*       (2013.01)
*G06F 3/042*       (2006.01)

(52) U.S. Cl.
CPC ........ *G06F 3/03542* (2013.01); *G06F 3/0383* (2013.01); *G06F 3/0421* (2013.01)

(58) Field of Classification Search
None
See application file for complete search history.

(56) References Cited

U.S. PATENT DOCUMENTS

2004/0140965 A1 *  7/2004  Wang ................. G06F 3/03545
                                               345/179
2012/0127110 A1 *  5/2012  Amm ................. G06F 3/03545
                                               345/174
(Continued)

FOREIGN PATENT DOCUMENTS

CN   107766852 A  *  3/2018  ......... G06K 9/00422
CN   104932717 B  *  4/2018
CN   110211017 A  *  9/2019

*Primary Examiner* — Kirk W Hermann
(74) *Attorney, Agent, or Firm* — Dragon Sun Law Firm, PC; Nathaniel Perkins

(57) ABSTRACT

An image processing method and apparatus for a smart pen, and an electronic device where the method comprises: monitoring a working state of a second pressure switch provided at a pen tip of a smart pen after a first pressure switch of the smart pen is in a closed state; controlling an infrared transceiver circuit on the smart pen to send an infrared signal to an area where the smart pen writes; acquiring a lightweight network model preset in the smart pen, so as to perform feature extraction processing on an original image; performing classification processing on a feature matrix by using a fully connected layer in the lightweight network model, to obtain a trajectory classification result; and displaying a writing trajectory of the smart pen on a target object in real time.

19 Claims, 6 Drawing Sheets

(56) References Cited

U.S. PATENT DOCUMENTS

2013/0113763 A1* 5/2013 Nungester ............... G06F 3/033
  345/179
2020/0174639 A1* 6/2020 Sun ....................... G06F 3/0383

* cited by examiner

IMAGE PROCESSING METHOD AND APPARATUS FOR SMART PEN INCLUDING PRESSURE SWITCHES, AND ELECTRONIC DEVICE

CROSS-REFERENCE TO RELATED APPLICATION

This Application is a national stage application of PCT/CN2020/110912. This application claims priorities from PCT Application No. PCT/CN2020/110912, filed Aug. 24, 2020, the content of which is incorporated herein in the entirety by reference.

TECHNICAL FIELD

The present disclosure relates to the technical field of data processing, and in particular to an image processing method and apparatus for a smart pen, and an electronic device.

BACKGROUND ART

Writing is a very wonderful experience, writing on paper always has a charm, and we always have a desire to preserve handwritten notes even in the information age. Especially in terms of smart education, there are all kinds of smart writing pens when black technologies such as electromagnetic writing recognition, infrared dot matrix recognition, and ultrasonic recognition are integrated into writing.

The infrared dot matrix recognition is as follows: a layer of invisible dot matrix pattern is printed on ordinary paper; a high-speed camera at a front end of a digital pen captures a movement trajectory of a pen tip at any time; a pressure sensor transmits pressure data back to a data processor at the same time; and finally, information is transmitted outward to a mobile phone or a tablet by means of Bluetooth or a USB cable, and the mobile phone or the tablet draws a handwriting synchronously.

In a process of recognizing a writing trajectory of a smart pen, how to reduce the use of smart pen system resources while ensuring the recognition accuracy is a problem that needs to be solved.

SUMMARY OF THE INVENTION

In view of this, embodiments of the present disclosure provide an image processing method and apparatus for a smart pen, and an electronic device, to at least partially solve the problems existing in the prior art.

In a first aspect, an embodiment of the present disclosure provides an image processing method for a smart pen, the image processing method comprising:

monitoring a working state of a second pressure switch provided at a pen tip of a smart pen after a first pressure switch of the smart pen is in a closed state;

controlling, after it is detected that the second pressure switch generates a trigger signal, an infrared transceiver circuit on the smart pen to send an infrared signal to an area where the smart pen writes, and to collect, in the form of an original image, a reflected signal corresponding to the infrared signal in the writing area at the same time, wherein the reflected signal describes a writing trajectory of the smart pen in the writing area, and the original image comprises two-dimensional coordinates of the writing trajectory on a writing screen;

acquiring a lightweight network model preset in the smart pen, so as to perform feature extraction processing on the original image on the basis of the lightweight network model and a current writing speed of the smart pen to obtain a feature matrix corresponding to the original image, wherein the network model comprises a first convolution calculation channel and a second convolution calculation channel, the first convolution calculation channel and the second convolution calculation channel comprise a first convolution kernel and a second convolution kernel respectively, and a size of the first convolution kernel is smaller than that of the second convolution kernel;

performing classification processing on the feature matrix by using a fully connected layer in the lightweight network model, to obtain a trajectory classification result; and adding current time information to the trajectory classification result to form a time-ordered trajectory vector, and sending, by means of a Bluetooth module on the smart pen, the trajectory vector to a target object with which the smart pen establishes a communication connection, so as to display a writing trajectory of the smart pen on the target object in real time.

According to a specific implementation of the embodiment of the present disclosure, the monitoring the working state of the second pressure switch provided at the pen tip of the smart pen comprises:

acquiring a pressure signal value and a pressure signal frequency of the second pressure switch;

determining whether the pressure signal value and the pressure signal frequency are respectively greater than a first threshold and a second threshold at the same time; and if yes, determining that the second pressure switch is in the working state.

According to a specific implementation of the embodiment of the present disclosure, said collecting, in the form of an original image, a reflected signal corresponding to the infrared signal in the writing area comprises:

activating an infrared camera apparatus provided on the smart pen;

controlling, according to a preset sampling period, the infrared camera apparatus to collect the reflected signal in the writing area to form a time-series-based reflected signal vector; and forming the original image on the basis of the collected reflected signal vector.

According to a specific implementation of the embodiment of the present disclosure, said performing feature extraction processing on the original image comprises:

acquiring a writing speed of the pen tip of the smart pen by means of an accelerometer provided on the smart pen;

determining whether the writing speed is greater than a preset speed value; and if yes, closing the second convolution calculation channel, and calculating the feature matrix of the original image in the first convolution calculation channel by using the first convolution kernel; or if no, performing feature calculations on the original image in both the first convolution calculation channel and the second convolution calculation channel to obtain a first calculation result and a second calculation result respectively, and obtaining the feature matrix of the original image on the basis of the first calculation result and the second calculation result.

According to a specific implementation of the embodiment of the present disclosure, said obtaining the feature matrix of the original image on the basis of the first calculation result and the second calculation result comprises:

performing a convolution operation on the original image in the first convolution calculation channel by using the first convolution kernel, to obtain the first calculation result;

performing a convolution operation on the first calculation result in the second convolution calculation channel by using the second convolution kernel, to obtain the second calculation result; and using the second calculation result as the feature matrix of the original image.

According to a specific implementation of the embodiment of the present disclosure, said performing classification processing on the feature matrix by using a fully connected layer in the lightweight network model comprises:

performing classification processing on the feature matrix in the fully connected layer to obtain a classification value corresponding to the feature matrix;

determining whether the classification value is greater than a preset value; and if yes, determining that there is a writing trajectory in the feature matrix.

According to a specific implementation of the embodiment of the present disclosure, said adding current time information to the trajectory classification result to form a time-ordered trajectory vector comprises:

acquiring two-dimensional plane coordinate values of the trajectory from the classification result;

adding a current time value to the two-dimensional plane coordinate values to form three-dimensional trajectory information; and forming the time-ordered trajectory vector on the basis of the three-dimensional trajectory information.

In a second aspect, an embodiment of the present disclosure provides an image processing apparatus for a smart pen, the image processing apparatus comprising:

a monitoring module configured to monitor a working state of a second pressure switch provided at a pen tip of a smart pen after a first pressure switch of the smart pen is in a closed state;

a control module configured to control, after it is detected that the second pressure switch generates a trigger signal, an infrared transceiver circuit on the smart pen to send an infrared signal to an area where the smart pen writes, and to collect, in the form of an original image, a reflected signal corresponding to the infrared signal in the writing area at the same time, wherein the reflected signal describes a writing trajectory of the smart pen in the writing area, and the original image comprises two-dimensional coordinates of the writing trajectory on a writing screen;

a processing module configured to acquire a lightweight network model preset in the smart pen, so as to perform feature extraction processing on the original image on the basis of the lightweight network model and a current writing speed of the smart pen to obtain a feature matrix corresponding to the original image, wherein the network model comprises a first convolution calculation channel and a second convolution calculation channel, the first convolution calculation channel and the second convolution calculation channel comprise a first convolution kernel and a second convolution kernel respectively, and a size of the first convolution kernel is smaller than that of the second convolution kernel;

a classification module configured to perform classification processing on the feature matrix by using a fully connected layer in the lightweight network model, to obtain a trajectory classification result; and an execution module configured to add current time information to the trajectory classification result to form a time-ordered trajectory vector, and to send, by means of a Bluetooth module on the smart pen, the trajectory vector to a target object with which the smart pen establishes a communication connection, so as to display a writing trajectory of the smart pen on the target object in real time.

In a third aspect, an embodiment of the present disclosure further provides an electronic device, comprising:

at least one processor; and a memory communicatively connected to the at least one processor, wherein the memory stores instructions executable by the at least one processor, and the instructions are executed by the at least one processor, such that the at least one processor is capable of implementing an image processing method for a smart pen in the preceding first aspect or in any implementation of the first aspect.

In a fourth aspect, an embodiment of the present disclosure further provides a non-transitory computer-readable storage medium, wherein the non-transitory computer-readable storage medium stores computer instructions configured to enable a computer to implement an image processing method for a smart pen in the preceding first aspect or in any implementation of the first aspect.

In a fifth aspect, an embodiment of the present disclosure further provides a computer program product, wherein the computer program product comprises a computer program stored on a non-transitory computer-readable storage medium, the computer program comprises program instructions, and when the program instructions are executed by a computer, the computer is enabled to implement an image processing method for a smart pen in the preceding first aspect or in any implementation of the first aspect.

An image processing solution for a smart pen in the embodiments of the present disclosure comprises: monitoring a working state of a second pressure switch provided at a pen tip of a smart pen after a first pressure switch of the smart pen is in a closed state; controlling, after it is detected that the second pressure switch generates a trigger signal, an infrared transceiver circuit on the smart pen to send an infrared signal to an area where the smart pen writes, and to collect, in the form of an original image, a reflected signal corresponding to the infrared signal in the writing area at the same time, wherein the reflected signal describes a writing trajectory of the smart pen in the writing area, and the original image comprises two-dimensional coordinates of the writing trajectory on a writing screen; acquiring a lightweight network model preset in the smart pen, so as to perform feature extraction processing on the original image on the basis of the lightweight network model and a current writing speed of the smart pen to obtain a feature matrix corresponding to the original image, wherein the network model comprises a first convolution calculation channel and a second convolution calculation channel, the first convolution calculation channel and the second convolution calculation channel comprise a first convolution kernel and a second convolution kernel respectively, and a size of the first convolution kernel is smaller than that of the second convolution kernel; performing classification processing on the feature matrix by using a fully connected layer in the lightweight network model, to obtain a trajectory classification result; and adding current time information to the trajectory classification result to form a time-ordered trajectory vector, and sending, by means of a Bluetooth module on the smart pen, the trajectory vector to a target object with which the smart pen establishes a communication connection, so as to display a writing trajectory of the smart pen on the target object in real time. The efficiency of image processing for a smart pen is improved by means of the processing solution of the present disclosure.

BRIEF DESCRIPTION OF THE DRAWINGS

In order to illustrate the technical solutions of the embodiments of the present disclosure more clearly, the accompanying drawings that need to be used for the embodiments will be briefly introduced below. Apparently, the accompanying drawings in the following description are merely for some embodiments of the present disclosure, and those of ordinary skill in the art can also derive other drawings from these accompanying drawings without involving any inventive effort.

DETAILED DESCRIPTION OF EMBODIMENTS

Figure 1:
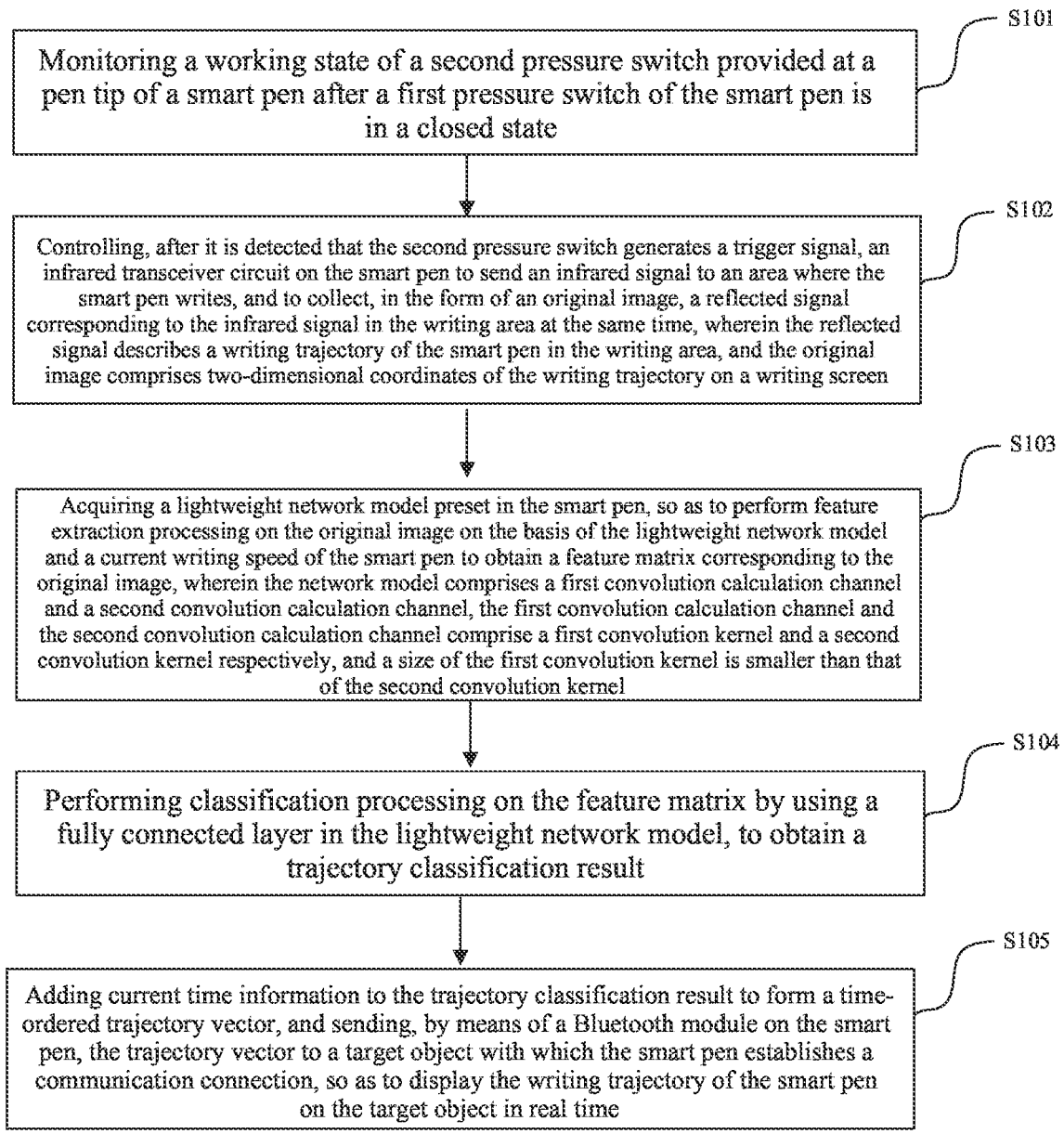
FIG. 1 is a flowchart of an image processing method for a smart pen provided in an embodiment of the present disclosure.

Embodiments of the present disclosure are described in detail below with reference to the accompanying drawings.

Implementations of the present disclosure are described below by means of specific examples, and those skilled in the art would have readily understood other advantages and effects of the present disclosure from the content disclosed in this specification. Apparently, the described embodiments are merely some rather than all of the embodiments of the present disclosure. The present disclosure may also be implemented or applied by means of other different specific implementations, and various details in this specification may also be modified or changed on the basis of different viewpoints and applications without departing from the spirit of the present disclosure. It should be noted that the following embodiments and features in the embodiments can be combined with each other without conflict. All the other embodiments obtained by those of ordinary skill in the art on the basis of the embodiments in the present disclosure without any creative effort shall fall within the scope of protection of the present disclosure.

It should be noted that various aspects of the embodiments within the scope of the appended claims are described below. It should be apparent that the aspects described herein may be embodied in a wide variety of forms, and any specific structure and/or function described herein are only illustrative. On the basis of the present disclosure, those skilled in the art should understand that one aspect described herein may be implemented independently of any other aspects, and two or more of these aspects may be combined in various ways. By way of example, any number of aspects illustrated herein may be used to implement a device and/or practice a method. In addition, other structures and/or functionalities than one or more of the aspects illustrated herein may be used to implement this device and/or practice this method.

It should be further noted that illustrations provided for the following embodiments schematically illustrate the basic idea of the present disclosure merely. The illustrations show merely assemblies related to the present disclosure but are not drawn according to the numbers, shapes, and sizes of the assemblies in actual implementation. The form, number, and proportion of each assembly may be changed at will during actual implementation thereof, and an assembly layout form thereof may also be more complicated.

In addition, in the following description, specific details are provided to facilitate a thorough understanding of the examples. However, those skilled in the art will understand that the aspects may be practiced without these specific details.

An embodiment of the present disclosure provides an image processing method for a smart pen. The image processing method for a smart pen provided in this embodiment may be executed by a computing apparatus. The computing apparatus may be implemented as software or a combination of software and hardware. The computing apparatus may be integrated into a server, a client, etc.

Referring to FIG. 1, the image processing method for a smart pen in the embodiment of the present disclosure may comprise the following steps:

S101, monitoring a working state of a second pressure switch provided at a pen tip of a smart pen after a first pressure switch of the smart pen is in a closed state.

In a process of using the smart pen, since there is no strict energy-saving management scheme, energy in a battery is usually consumed too quickly, and the service life of power stored in the smart pen is affected.

Figure 4:
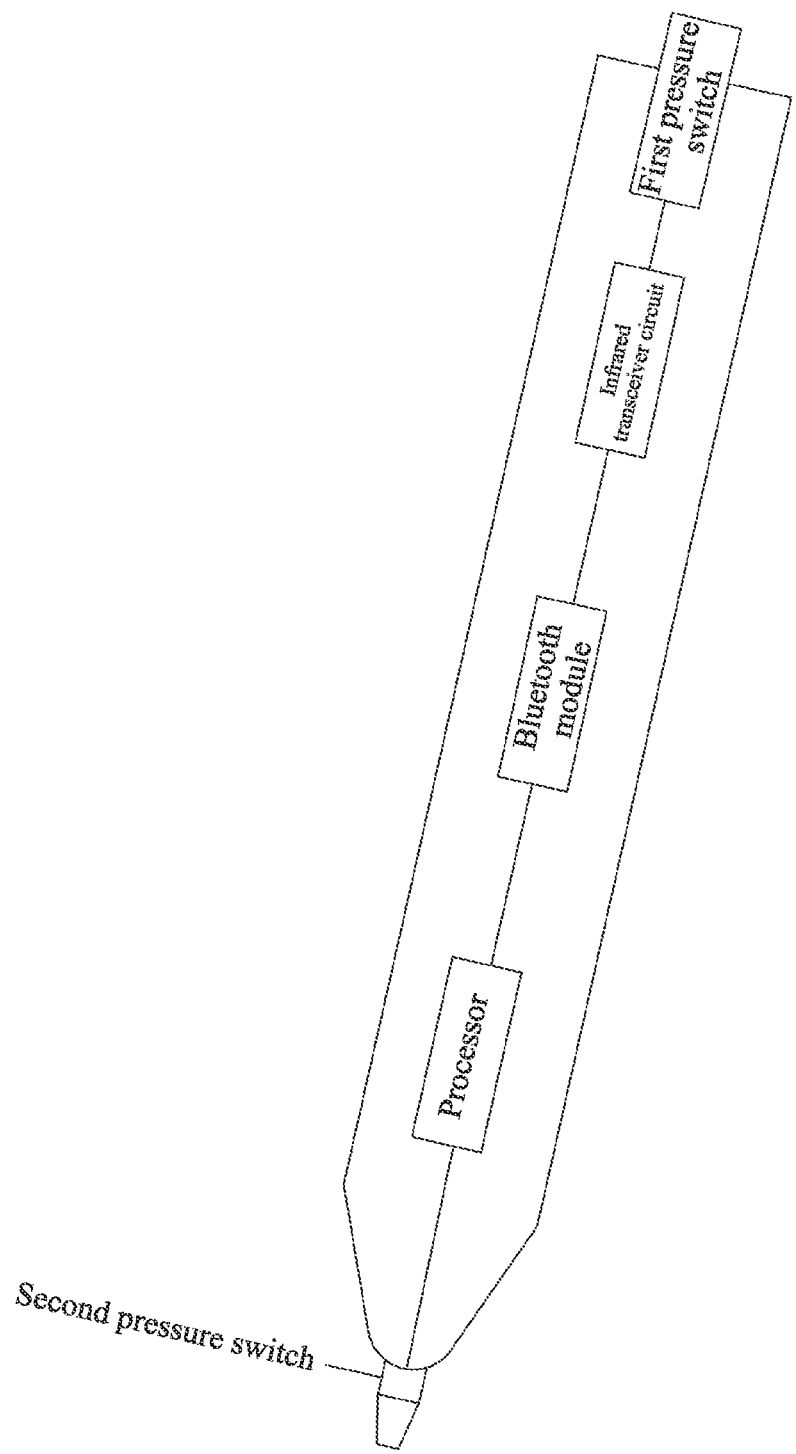
FIG. 4 is a schematic structural diagram of a smart pen provided in an embodiment of the present disclosure.

To this end, the first pressure switch is provided at an end of the smart pen (see FIG. 4). A user may set a state of the first pressure switch to the closed state when using the smart pen to perform a writing operation. After the first pressure switch is closed, the first pressure switch transfers a connected driving voltage to a component (for example, a processor) of the smart pen on which a power supply operation needs to be performed, so that the voltage can be conserved. In a case, after the time for which the smart pen is in the closed state reaches a preset value and the smart pen does not perform a writing operation, the state of the first pressure switch may be automatically converted from the closed state to an open state.

The second pressure switch is provided at the pen tip of the smart pen. The first pressure switch automatically supplies power to the second pressure switch when the first pressure switch is in the closed electrically-connected state, so as to activate the second pressure switch. When the user performs a writing operation on a piece of writing paper with the smart pen, after a pressure of the pen tip exceeds a preset threshold, the second pressure switch automatically generates a trigger signal, which may be transferred to the processor by means of a connecting wire for next processing.

In an actual running process, the processor may be used to monitor the working state of the first pressure switch and that of the second pressure switch, specifically to monitor the working state of the second pressure switch provided at the pen tip of the smart pen after the first pressure switch is in the closed state.

S102, controlling, after it is detected that the second pressure switch generates a trigger signal, an infrared transceiver circuit on the smart pen to send an infrared signal to an area where the smart pen writes, and to collect, in the form of an original image, a reflected signal corresponding to the infrared signal in the writing area at the same time, wherein the reflected signal describes a writing trajectory of the smart pen in the writing area, and the original image comprises two-dimensional coordinates of the writing trajectory on a writing screen.

The smart pen is provided with the infrared transceiver circuit, and can send infrared signals to the writing area of the smart pen by means of the infrared transceiver circuit, so as to further determine a writing trajectory of the smart pen on the basis of reflected signals corresponding to the infrared signals and then form an original image describing the writing trajectory. In order to further describe the detected writing trajectory, two-dimensional plane coordinates comprising the writing trajectory may be provided in the original image, to describe the specific position of the writing trajectory by means of the two-dimensional plane coordinates.

S103, acquiring a lightweight network model preset in the smart pen, so as to perform feature extraction processing on the original image on the basis of the lightweight network model and a current writing speed of the smart pen to obtain a feature matrix corresponding to the original image, wherein the network model comprises a first convolution calculation channel and a second convolution calculation channel, the first convolution calculation channel and the second convolution calculation channel comprise a first convolution kernel and a second convolution kernel respectively, and a size of the first convolution kernel is smaller than that of the second convolution kernel.

The lightweight network model may be provided in the smart pen to improve the recognition accuracy of the writing trajectory. The lightweight network model may be a neural network model comprising a plurality of convolutional layers and fully connected layers. Alternatively, it may be another network model with an image recognition function. The recognition accuracy of the lightweight network model can be improved by training the lightweight network model with preset training data.

The lightweight network model comprises a plurality of calculation channels, for example, may comprise the first convolution calculation channel and the second convolution calculation channel Certainly, a similar third convolution calculation channel and fourth convolution calculation channel may also be provided according to actual requirements.

In addition to the above calculation channels, a plurality of convolution kernels may be provided, for example, the first convolution kernel and the second convolution kernel may be provided, and the size of the first convolution kernel is smaller than that of the second convolution kernel.

The accuracy of recognizing the original image can be improved by performing image recognition on the original image through the plurality of calculation channels, but more system resources are consumed. To this end, a writing speed of the smart pen at the pen tip may be further acquired. An accelerometer may be provided at the pen tip of the smart pen, to acquire the writing speed of the smart pen by means of the accelerometer. When the writing speed is greater than a preset speed value, the second convolution calculation channel is closed, and the feature matrix of the original image is calculated in the first convolution calculation channel by using the first convolution kernel; otherwise, feature calculations are performed on the original image in both the first convolution calculation channel and the second convolution calculation channel to obtain a first calculation result and a second calculation result respectively, and the feature matrix of the original image is obtained on the basis of the first calculation result and the second calculation result. In this way, an effective balance can be obtained between the accuracy of image recognition and the calculation efficiency.

S104, performing classification processing on the feature matrix by using a fully connected layer in the lightweight network model, to obtain a trajectory classification result.

Specifically, classification processing is performed on the feature matrix in the fully connected layer to obtain a classification value corresponding to the feature matrix, and whether the detected image comprises a writing trajectory is determined by further determining whether the classification value is greater than a preset value, so as to determine whether there is a writing trajectory in the feature matrix.

S105, adding current time information to the trajectory classification result to form a time-ordered trajectory vector, and sending, by means of a Bluetooth module on the smart pen, the trajectory vector to a target object with which the smart pen establishes a communication connection, so as to display a writing trajectory of the smart pen on the target object in real time.

The time information may be added to the recognized writing trajectory to further reproduce the writing trajectory, so that written content can be displayed to the user on the basis of time series. In an approach, the Bluetooth module provided on the smart pen may be used to send the recognized writing trajectory to the target object, so as to display a writing trajectory of the smart pen on the target object in real time. The target object may be an electronic device with a data calculation function such as a mobile phone or a computer.

The trajectory recognition efficiency of the smart pen is improved based on the content of the above embodiment.

Figure 2:
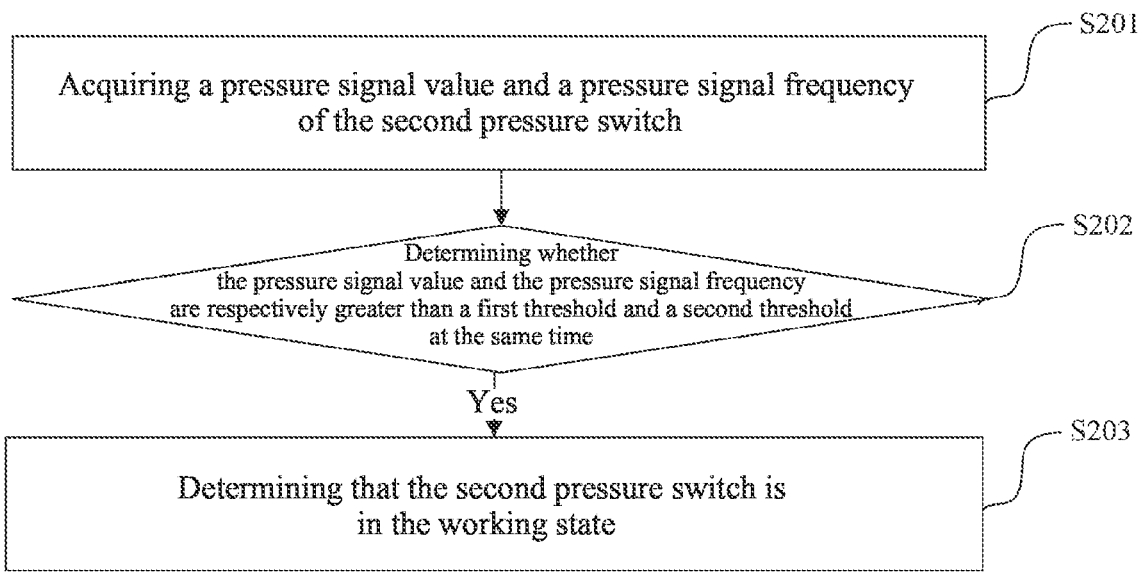
FIG. 2 is a flowchart of another image processing method for a smart pen provided in an embodiment of the present disclosure.

Referring to FIG. 2, according to a specific implementation of the embodiment of the present disclosure, the monitoring the working state of the second pressure switch provided at the pen tip of the smart pen comprises:

S201, acquiring a pressure signal value and a pressure signal frequency of the second pressure switch;

S202, determining whether the pressure signal value and the pressure signal frequency are respectively greater than a first threshold and a second threshold at the same time; and S203, if yes, determining that the second pressure switch is in the working state.

According to a specific implementation of the embodiment of the present disclosure, said collecting, in the form of an original image, a reflected signal corresponding to the infrared signal in the writing area comprises: activating an infrared camera apparatus provided on the smart pen; controlling, according to a preset sampling period, the infrared camera apparatus to collect the reflected signal in the writing area to form a time-series-based reflected signal vector; and forming the original image on the basis of the collected reflected signal vector.

Figure 3:
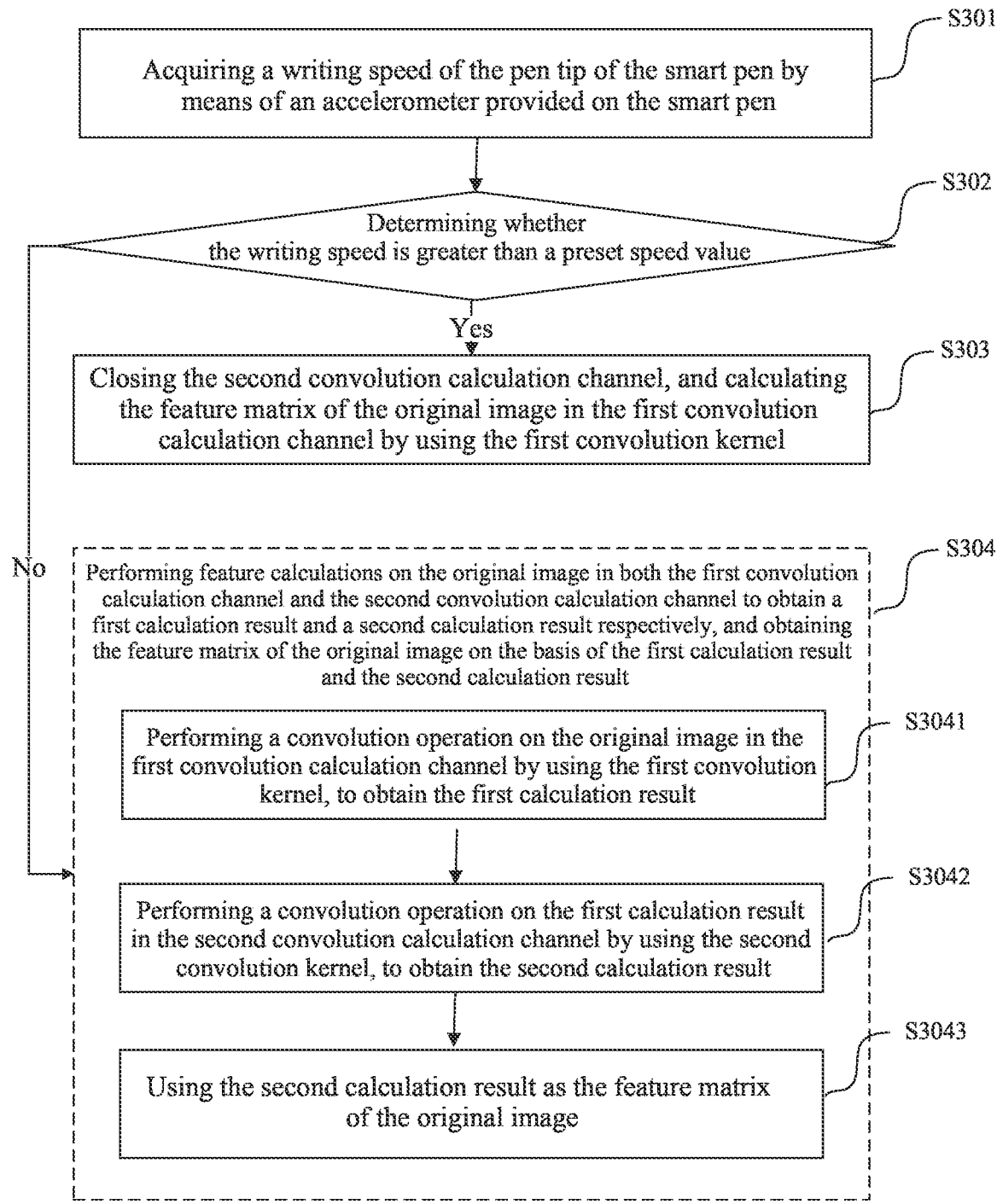
FIG. 3 is a flowchart of yet another image processing method for a smart pen provided in an embodiment of the present disclosure.

Referring to FIG. 3, according to a specific implementation of the embodiment of the present disclosure, said performing feature extraction processing on the original image comprises:

S301, acquiring a writing speed of the pen tip of the smart pen by means of an accelerometer provided on the smart pen;

S302, determining whether the writing speed is greater than a preset speed value; and S303, if yes, closing the second convolution calculation channel, and calculating the feature matrix of the original image in the first convolution calculation channel by using the first convolution kernel; or S304, if no, performing feature calculations on the original image in both the first convolution calculation channel and the second convolution calculation channel to obtain a first calculation result and a second calculation result respectively, and obtaining the feature matrix of the original image on the basis of the first calculation result and the second calculation result.

Specifically, in a process of implementing step S304, the following steps may be further comprised:

S3041, performing a convolution operation on the original image in the first convolution calculation channel by using the first convolution kernel, to obtain the first calculation result;

S3042, performing a convolution operation on the first calculation result in the second convolution calculation channel by using the second convolution kernel, to obtain the second calculation result; and S3043, using the second calculation result as the feature matrix of the original image.

According to a specific implementation of the embodiment of the present disclosure, said performing classification processing on the feature matrix by using a fully connected layer in the lightweight network model comprises: performing classification processing on the feature matrix in the fully connected layer to obtain a classification value corresponding to the feature matrix; determining whether the classification value is greater than a preset value; and if yes, determining that there is a writing trajectory in the feature matrix.

According to a specific implementation of the embodiment of the present disclosure, said adding current time information to the trajectory classification result to form a time-ordered trajectory vector comprises: acquiring two-dimensional plane coordinate values of the trajectory from the classification result; adding a current time value to the two-dimensional plane coordinate values to form three-dimensional trajectory information; and forming the time-ordered trajectory vector on the basis of the three-dimensional trajectory information.

Figure 5:
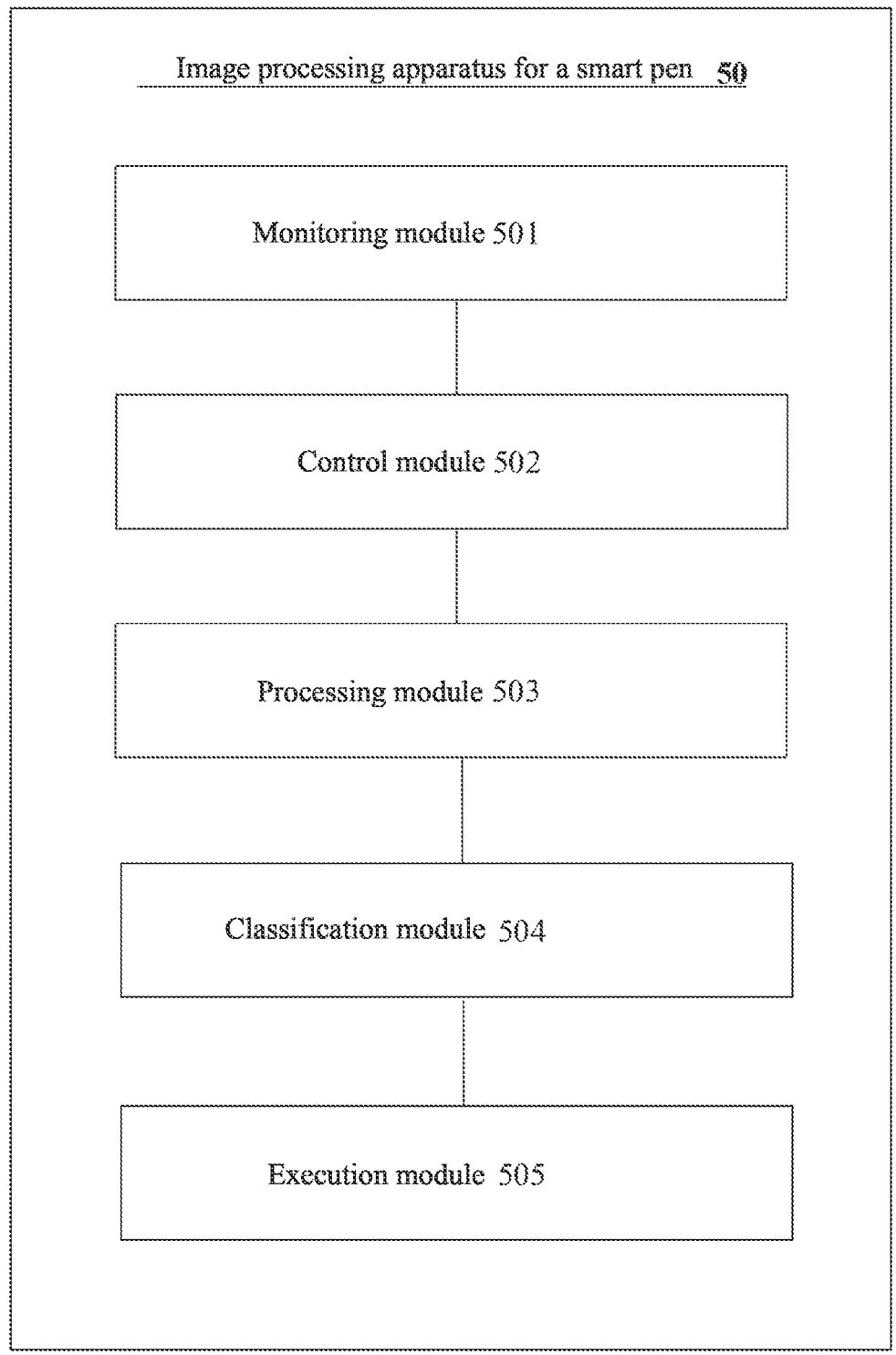
FIG. 5 is a schematic structural diagram of an image processing apparatus for a smart pen provided in an embodiment of the present disclosure.

Corresponding to the above method embodiment, referring to FIG. 5, an embodiment of the present disclosure further provides an image processing apparatus 50 for a smart pen. The image processing apparatus comprises:

a monitoring module 501 configured to monitor a working state of a second pressure switch provided at a pen tip of a smart pen after a first pressure switch of the smart pen is in a closed state;

a control module 502 configured to control, after it is detected that the second pressure switch generates a trigger signal, an infrared transceiver circuit on the smart pen to send an infrared signal to an area where the smart pen writes, and to collect, in the form of an original image, a reflected signal corresponding to the infrared signal in the writing area at the same time, wherein the reflected signal describes a writing trajectory of the smart pen in the writing area, and the original image comprises two-dimensional coordinates of the writing trajectory on a writing screen;

a processing module 503 configured to acquire a lightweight network model preset in the smart pen, so as to perform feature extraction processing on the original image on the basis of the lightweight network model and a current writing speed of the smart pen to obtain a feature matrix corresponding to the original image, wherein the network model comprises a first convolution calculation channel and a second convolution calculation channel, the first convolution calculation channel and the second convolution calculation channel comprise a first convolution kernel and a second convolution kernel respectively, and a size of the first convolution kernel is smaller than that of the second convolution kernel;

a classification module 504 configured to perform classification processing on the feature matrix by using a fully connected layer in the lightweight network model, to obtain a trajectory classification result; and an execution module 505 configured to add current time information to the trajectory classification result to form a time-ordered trajectory vector, and to send, by means of a Bluetooth module on the smart pen, the trajectory vector to a target object with which the smart pen establishes a communication connection, so as to display a writing trajectory of the smart pen on the target object in real time.

For parts that are not described in detail in this embodiment, reference can be made to the content specified in the above method embodiment, and details thereof are not described herein again.

Figure 6:
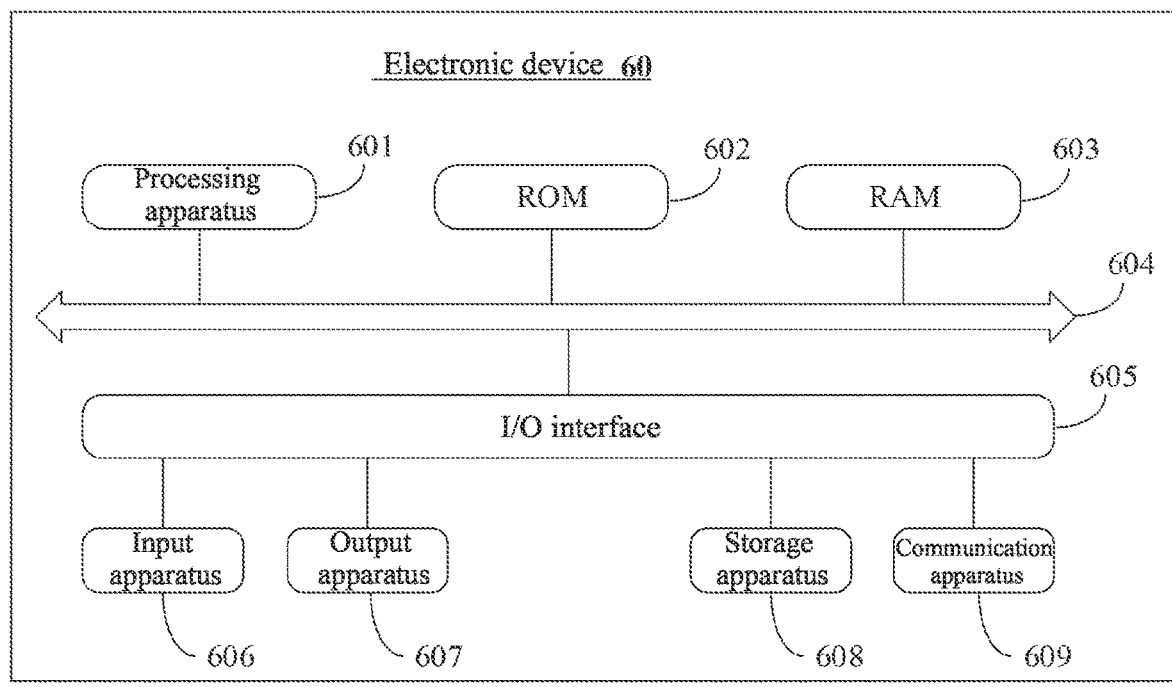
FIG. 6 is a schematic diagram of an electronic device provided in an embodiment of the present disclosure.

Referring to FIG. 6, an embodiment of the present disclosure further provides an electronic device 60. The electronic device comprises:

at least one processor; and a memory communicatively connected to the at least one processor, wherein the memory stores instructions executable by the at least one processor, and the instructions are executed by the at least one processor, such that the at least one processor can implement the image processing method for a smart pen in the preceding method embodiment.

An embodiment of the present disclosure further provides a non-transitory computer-readable storage medium, wherein the non-transitory computer-readable storage medium stores computer instructions configured to enable a computer to implement the image processing method for a smart pen in the preceding method embodiment.

An embodiment of the present disclosure further provides a computer program product, wherein the computer program product comprises a computer program stored on a non-transitory computer-readable storage medium, the computer program comprises program instructions, and when the program instructions are executed by a computer, the computer is enabled to implement the image processing method for a smart pen in the preceding method embodiment.

Reference is made to FIG. 6 below, which shows a schematic structural diagram of the electronic device 60 suitable for implementing the embodiment of the present disclosure. The electronic device in the embodiment of the present disclosure may include, but is not limited to: a mobile terminal such as a mobile phone, a notebook computer, a digital broadcast receiver, a PDA (personal digital assistant), a PAD (tablet computer), a PMP (portable multimedia player), or a vehicle-mounted terminal (such as a vehicle-mounted navigation terminal); and a fixed terminal such as a digital TV or a desktop computer. The electronic device shown in FIG. 6 is merely an example, and should not impose any limitation to the function and the usage range of the embodiment of the present disclosure.

As shown in FIG. 6, the electronic device 60 may comprise a processing apparatus (such as a central processing unit or a graphics processor) 601, which may perform various appropriate actions and processing according to a program stored in a read-only memory (ROM) 602 or a program loaded from a storage apparatus 608 into a random access memory (RAM) 603. Various programs and data required for the operation of the electronic device 60 are further stored in the RAM 603. The processing apparatus 601, the ROM 602, and the RAM 603 are connected to one another via a bus 604. An input/output (I/O) interface 605 is also connected to the bus 604.

Generally, the following apparatuses may be connected to the I/O interface 605: an input apparatus 606 comprising, for example, a touch screen, a touchpad, a keyboard, a mouse, an image sensor, a microphone, an accelerometer, and a gyroscope; an output apparatus 607 comprising, for example, a liquid crystal display (LCD), a loudspeaker, and a vibrator; a storage apparatus 608 comprising, for example, a magnetic tape and a hard disk; and a communication apparatus 609. The communication apparatus 609 may allow the electronic device 60 to perform wireless or wired communication with other devices to exchange data. Although the figure shows the electronic device 60 having various apparatuses, it should be understood that it is not necessary to implement or have all the apparatuses shown. Alternatively, it is possible to implement or have more or fewer apparatuses.

In particular, the process described above with reference to the flowchart may be implemented as a computer software program according to the embodiment of the present disclosure. For example, an embodiment of the present disclosure comprises a computer program product, which comprises a computer program carried on a computer-readable medium, and the computer program comprises program codes for implementing the method shown in the flowchart. In such an embodiment, the computer program may be downloaded and installed from a network by means of the communication apparatus 609, or installed from the storage apparatus 608, or installed from the ROM 602. The above functions defined in the method of the embodiments of the present disclosure are implemented when the computer program is executed by the processing apparatus 601.

It should be noted that the above computer-readable medium in the present disclosure may be a computer-readable signal medium, or a computer-readable storage medium, or any combination of the two. The computer-readable storage medium may be, for example, but is not limited to: an electric, magnetic, optical, electromagnetic, infrared, or semiconductor system, apparatus, or device, or any combination thereof. A more specific example of the computer-readable storage medium may include, but is not limited to: an electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, the computer-readable storage medium may be any tangible medium that contains or stores a program, which may be used by or used in combination with an instruction execution system, apparatus, or device. In the present disclosure, the computer-readable signal medium may comprise a data signal that is propagated in a baseband or as a part of a carrier wave, in which computer-readable program codes are carried. Such a propagated data signal may take a variety of forms, including, but not limited to, an electromagnetic signal, an optical signal, or any suitable combination thereof. The computer-readable signal medium may also be any computer-readable medium other than the computer-readable storage medium. The computer-readable signal medium may send, propagate, or transmit a program for use by or use in combination with an instruction execution system, apparatus, or device. The program code contained on the computer-readable medium may be transmitted by using any suitable medium, including but not limited to: an electric wire, an optical cable, RF (radio frequency), etc., or any suitable combination thereof.

The above computer-readable medium may be contained in the above electronic device; or may exist alone without being assembled into the electronic device.

The above computer-readable medium carries one or more programs, and when the above one or more programs are executed by the electronic device, the electronic device is enabled to: acquire at least two Internet Protocol addresses; send a node evaluation request comprising the at least two Internet Protocol addresses to a node evaluation device, wherein the node evaluation device selects an Internet Protocol address from the at least two Internet Protocol addresses and returns the Internet Protocol address; and receive the Internet Protocol address returned from the node evaluation device, wherein the acquired Internet Protocol address indicates an edge node in a content delivery network.

Alternatively, the above computer-readable medium carries one or more programs, and when the above one or more programs are executed by the electronic device, the electronic device is enabled to: receive a node evaluation request comprising at least two Internet Protocol addresses; select an Internet Protocol address from the at least two Internet Protocol addresses; and return the selected Internet Protocol address, wherein the received Internet Protocol address indicates an edge node in a content delivery network.

The computer program codes for performing the operations of the present disclosure may be written in one or more programming languages or a combination thereof. The above programming languages comprise an object-oriented programming language, such as Java, Smalltalk, and C++; and further comprise a conventional procedural programming language, such as a "C" language or a similar programming language. The program codes may be fully executed on a user computer, partly executed on a user computer, executed as an independent software package, executed partly on a user computer and partly on a remote computer, or fully executed on a remote computer or server. In the case of a remote computer, the remote computer may be connected to a user computer through any kind of network, including a local area network (LAN) or a wide area network (WAN); or may be connected to an external computer (for example, connected to the external computer through the Internet with the aid of an Internet service provider).

The flowcharts and block diagrams in the accompanying drawings illustrate possibly implemented architectures, functions, and operations of the system, method, and computer program product according to various embodiments of the present disclosure. In this regard, each block in the flowcharts or block diagrams may represent a module, a program segment, or a part of a code, which comprises one or more executable instructions for implementing specified logical functions. It should also be noted that, in some alternative implementations, functions marked in the blocks may also occur in an order different from that marked in the accompanying drawings. For example, two blocks represented in succession may actually be executed basically in parallel, or they may sometimes be executed in reverse order, depending on the functions involved. It should also be noted that each block in the block diagrams and/or flowcharts and a combination of blocks in the block diagrams and/or flowcharts may be implemented by a dedicated hardware-based system that performs specified functions or operations, or may be implemented by a combination of dedicated hardware and a computer instruction.

Units involved in the embodiments described in the present disclosure may be implemented in a software manner, or may be implemented in a hardware manner. The name of a unit does not constitute a limitation on the unit itself under a certain circumstance. For example, a first acquiring unit may also be described as "a unit for acquiring at least two Internet Protocol addresses".

It should be understood that each part of the present disclosure may be implemented by hardware, software, firmware, or a combination thereof.

The foregoing description is merely specific implementations of the present disclosure, but is not intended to limit the scope of protection of the present disclosure. Any variation or replacement that can be readily conceived by those skilled in the art within the technical scope disclosed by the present disclosure shall fall within the scope of protection of the present disclosure. Therefore, the scope of protection of the present disclosure shall be subject to the scope of protection of the claims.

The invention claimed is:

1. An image processing method for a smart pen, the image processing method comprising:
   monitoring a working state of a second pressure switch provided at a pen tip of a smart pen after a first pressure switch of the smart pen is in a closed state;
   controlling, after it is detected that the second pressure switch generates a trigger signal, an infrared transceiver circuit on the smart pen to send an infrared signal to an area where the smart pen writes, and to collect, in a form of an original image, a reflected signal corresponding to the infrared signal in the writing area at a same time, wherein the reflected signal describes a writing trajectory of the smart pen in the writing area, and the original image comprises two-dimensional coordinates of the writing trajectory on a writing screen;
   acquiring a lightweight network model preset in the smart pen, so as to perform feature extraction processing on the original image on a basis of the lightweight network model and a current writing speed of the smart pen to obtain a feature matrix corresponding to the original image, wherein the network model comprises a first convolution calculation channel and a second convolution calculation channel, the first convolution calculation channel and the second convolution calculation channel comprise a first convolution kernel and a second convolution kernel respectively, and a size of the first convolution kernel is smaller than that of the second convolution kernel;
   performing classification processing on the feature matrix by using a fully connected layer in the lightweight network model, to obtain a trajectory classification result; and
   adding current time information to the trajectory classification result to form a time-ordered trajectory vector, and sending, by means of a Bluetooth module on the smart pen, the trajectory vector to a target object with which the smart pen establishes a communication connection, so as to display a writing trajectory of the smart pen on the target object in real time.

2. An electronic device, comprising:
   at least one processor; and
   a memory communicatively connected to the at least one processor, wherein
   the memory stores instructions executable by the at least one processor, and the instructions are executed by the at least one processor, such that the at least one processor is capable of implementing an image processing method for a smart pen of claim 1.

3. A non-transitory computer-readable storage medium, wherein the non-transitory computer-readable storage medium stores computer instructions configured to enable a computer to implement an image processing method for a smart pen of claim 1.

4. The method according to claim 1, wherein said performing classification processing on the feature matrix by using a fully connected layer in the lightweight network model comprises:
   performing classification processing on the feature matrix in the fully connected layer to obtain a classification value corresponding to the feature matrix;
   determining whether the classification value is greater than a preset value; and
   if yes, determining that there is a writing trajectory in the feature matrix.

5. An electronic device, comprising:
   at least one processor; and
   a memory communicatively connected to the at least one processor, wherein
   the memory stores instructions executable by the at least one processor, and the instructions are executed by the at least one processor, such that the at least one processor is capable of implementing an image processing method for a smart pen of claim 4.

6. The method according to claim 1, wherein said adding current time information to the trajectory classification result to form a time-ordered trajectory vector comprises:
   acquiring two-dimensional plane coordinate values of the trajectory from the classification result;
   adding a current time value to the two-dimensional plane coordinate values to form three-dimensional trajectory information; and
   forming the time-ordered trajectory vector on a basis of the three-dimensional trajectory information.

7. An electronic device, comprising:
   at least one processor; and
   a memory communicatively connected to the at least one processor, wherein
   the memory stores instructions executable by the at least one processor, and the instructions are executed by the at least one processor, such that the at least one processor is capable of implementing an image processing method for a smart pen of claim 6.

8. The method according to claim 1, wherein the monitoring the working state of the second pressure switch provided at the pen tip of the smart pen comprises:

acquiring a pressure signal value and a pressure signal frequency of the second pressure switch;

determining whether the pressure signal value and the pressure signal frequency are respectively greater than a first threshold and a second threshold at the same time; and if yes, determining that the second pressure switch is in the working state.

9. An electronic device, comprising:

at least one processor; and a memory communicatively connected to the at least one processor, wherein the memory stores instructions executable by the at least one processor, and the instructions are executed by the at least one processor, such that the at least one processor is capable of implementing an image processing method for a smart pen of claim 8.

10. A non-transitory computer-readable storage medium, wherein the non-transitory computer-readable storage medium stores computer instructions configured to enable a computer to implement an image processing method for a smart pen of claim 8.

11. The method according to claim 8, wherein said collecting, in the form of an original image, a reflected signal corresponding to the infrared signal in the writing area comprises:

activating an infrared camera apparatus provided on the smart pen;

controlling, according to a preset sampling period, the infrared camera apparatus to collect the reflected signal in the writing area to form a time-series-based reflected signal vector; and forming the original image on a basis of the collected reflected signal vector.

12. An electronic device, comprising:

at least one processor; and a memory communicatively connected to the at least one processor, wherein the memory stores instructions executable by the at least one processor, and the instructions are executed by the at least one processor, such that the at least one processor is capable of implementing an image processing method for a smart pen of claim 11.

13. A non-transitory computer-readable storage medium, wherein the non-transitory computer-readable storage medium stores computer instructions configured to enable a computer to implement an image processing method for a smart pen of claim 11.

14. The method according to claim 11, wherein said performing feature extraction processing on the original image comprises:

acquiring a writing speed of the pen tip of the smart pen by means of an accelerometer provided on the smart pen;

determining whether the writing speed is greater than a preset speed value; and if yes, closing the second convolution calculation channel, and calculating the feature matrix of the original image in the first convolution calculation channel by using the first convolution kernel; or if no, performing feature calculations on the original image in both the first convolution calculation channel and the second convolution calculation channel to obtain a first calculation result and a second calculation result respectively, and obtaining the feature matrix of the original image on a basis of the first calculation result and the second calculation result.

15. An electronic device, comprising:

at least one processor; and a memory communicatively connected to the at least one processor, wherein the memory stores instructions executable by the at least one processor, and the instructions are executed by the at least one processor, such that the at least one processor is capable of implementing an image processing method for a smart pen of claim 14.

16. A non-transitory computer-readable storage medium, wherein the non-transitory computer-readable storage medium stores computer instructions configured to enable a computer to implement an image processing method for a smart pen of claim 14.

17. The method according to claim 14, wherein said obtaining the feature matrix of the original image on the basis of the first calculation result and the second calculation result comprises:

performing a convolution operation on the original image in the first convolution calculation channel by using the first convolution kernel, to obtain the first calculation result;

performing a convolution operation on the first calculation result in the second convolution calculation channel by using the second convolution kernel, to obtain the second calculation result; and using the second calculation result as the feature matrix of the original image.

18. An electronic device, comprising:

at least one processor; and a memory communicatively connected to the at least one processor, wherein the memory stores instructions executable by the at least one processor, and the instructions are executed by the at least one processor, such that the at least one processor is capable of implementing an image processing method for a smart pen of claim 17.

19. A non-transitory computer-readable storage medium, wherein the non-transitory computer-readable storage medium stores computer instructions configured to enable a computer to implement an image processing method for a smart pen of claim 17.

* * * * *